Jan. 26, 1937.   E. W. ESDAILE ET AL   2,069,137
SOUND FILM APPARATUS
Filed Aug. 15, 1935
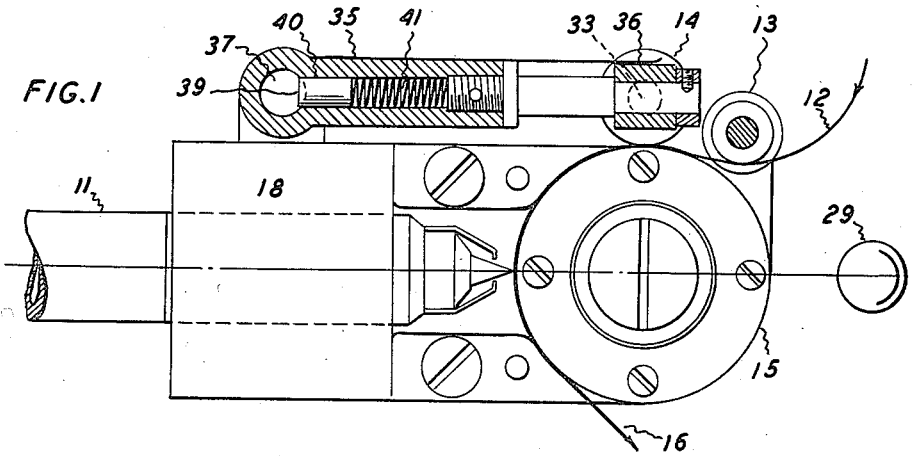
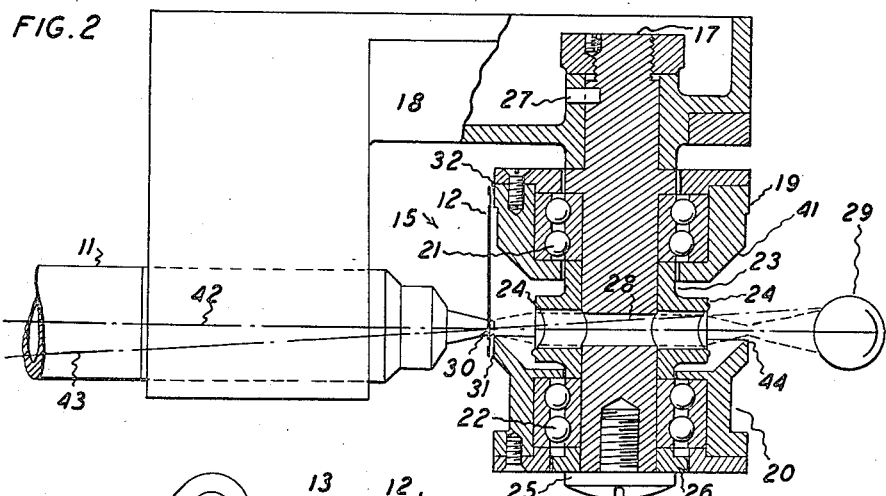
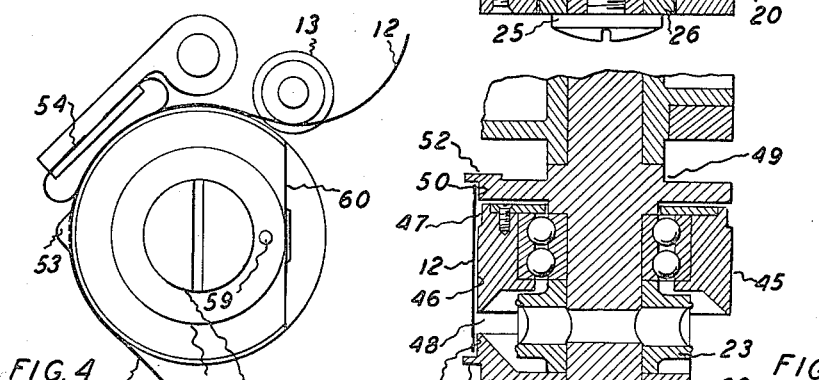
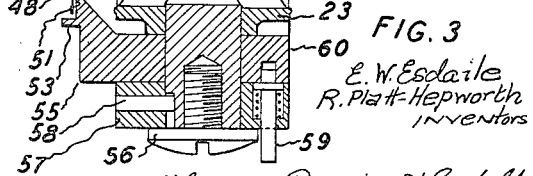

_Patented Jan. 26, 1937_                                                  2,069,137

UNITED STATES PATENT OFFICE 2,069,137

SOUND FILM APPARATUS

Edward William Esdaile, Arncliffe, near Sydney, New South Wales, and Robert Platt-Hepworth, Paddington, near Sydney, New South Wales, Australia Application August 15, 1935, Serial No. 36,441
In Australia August 23, 1934

8 Claims. (Cl. 179—100.3)

This invention relates to sound gates for reproducing sound from motion films, and particularly to rotary sound gates to which rotation is applied by the film passing over it.

In sound gates of the type referred to, the greater part of the width of the film contacts with the face of the sound head; the sound gate is tubular and is divided circumferentially under the sound track to permit passage of the light beam through the sound track, and the margin of the film outside the sound track may or may not be supported; the light beam is deflected by a mirror or prism on the interior of the sound gate, the beam being thence directed axially of the sound gate through an optical system, to the light sensitive cell. If the edges of the light beam impinge on the margins of the circumferential light way in the gate efficiency in sound reproduction is lost; this defect is accentuated when microscopic dust particles are held on the edges on which the rays impinge.

In sound gates according to the present invention the light beam passes transversely through the gate direct to the light sensitive cell via the optical system without suffering intermediate reflection or deflection. In one form the parts on which the film margins run are independently rotatable in axial alignment and the optical system is fitted in a non-rotating member between them, this member being fixed to a fixed stud on which the rotating members are journalled. In another form of the gate the mid part of the film runs on a rotatable member and its marginal portions preferably run just clear of guide tracks on fixed flange members.

In the accompanying drawing:—

Fig. 1 is a fragmentary end view corresponding with Fig. 2;

Fig. 2 is a sectional view illustrating the arrangement in which the film margins are borne on separately rotatable members;

Fig. 3 is a sectional view illustrating the sound gate in which the central portion of the film is borne on a freely rotatable member, and its margins run over non-rotating guide members; and Fig. 4 is an end view corresponding with Fig. 3.

In Figs. 1 and 2, 11 is the light tube, 12 is a film passing under a flanged direction roller 13, and marginal contact rollers 14 which hold it in light contact with the rotatable members 19 and 20. The assembly is supported on a fixed stud 17 projecting from the frame 18 and keyed against turning therein at 27. The two rotatable elements 19 and 20 are independently journalled on anti-friction bearings 21 and 22 respectively on the stud 17. Intermediate the inner races of the bearings 21 and 22, and acting as a distance piece between them on the stud 17 is a block 23, all being locked in position against displacement by the screw 25 and washer 26.

The block 23 has an aperture 28 transversely through it, this aperture passing also through the stud 17 and emerging through bosses 24. The optical system is fitted in this aperture in axial relation to the light beam which is projected from the tube 11. 29 is the light sensitive cell, on which the light beam is directed from the optical system.

The centre line of the sound track on the film coincides (30) with the axis of the light beam, and the neighboring margin of the film 12 rides on the flanged edge 31 of the rotatable member 20, driving it. The other margin of the film runs on the flanged edge 32 of the other rotatable member 19, driving it. The mass inertias of the separate rotors 19 and 20 are equalized to favor uniform rotation, the film contact being no heavier than is essential. Equal pressure on the film margins is ensured by the two idler rollers 14, which rotate freely on an axle 33 which is free to rock transversely on the outer end of the arm 35. A light spring 36 is attached to this arm and bears symmetrically on the axle 33 to prevent undue rotation of the axle 33 round the axis of the arm 35. The arm is hollow and a spring 41 within it bears endwise on a flat ended plunger 40 which in turn bears on a flat 39 cut in a fixed pin 37 on which the arm may be rocked. The pin 37 may be adjustable to enable variation of the spring tension. Pressure may be applied by a single roller to the medial portion of the film, the roller being held in a forked support which is swivelled on the axis of the arm 35.

The element 19 is cut away at 41 to facilitate access to the optical system for cleaning purposes.

The axis (42) of the light beam may be tilted laterally to a slight degree as suggested at 43 in order to further minimize risk of light fringing at the edge 44 of the element 20.

In Figs. 3 and 4 the revolving drum 45 on which the mid part of the film 12 runs is journalled on the stud 49 and the optical block 23 is fixed on the transversely apertured stud as in the previous case. The film 12 is in driving contact at 46 with the drum 45, a part of the drum face being recessed (47) to centre the film bearing on the drum face. The margins of the films may be supported in running contact with the faces 50 and 51 of stationary members which are fixed on the stud 49, and one or more small lateral guide fins 52 and 53 may be provided for centering the film. Light pressure is applied to the film and may be applied to the margins by a pad 54 as it passes round the drum, or by a jockey pulley.

The outer fixed member 55 is held on the spindle 49 by a screw 56 and a washer 57, the washer being held against rotation on the spindle by a key 58. A spring influenced latch pin 59 is fitted in the washer which holds the member 55 against rotation while in the operating position. A portion of the member 55 and the washer 57 is cut away at 60 to facilitate cleaning of one end of the optical system. By withdrawing the latch pin 59 and turning the members 55 180° on the stud, cleaning is facilitated on the other end of the optical system.

The optical block 23 may be made integral with the stud in either arrangement shown.

What we claim as our invention and desire to secure by Letters Patent is:—

1. A rotating sound gate including a fixed stud provided with a transverse orifice adapted to be arranged between a source of exciting light and a light sensitive cell, an optical system contained in the orifice the axis of which is in substantial alignment with the exciting light, and at least one film supporting member rotatable on said stud laterally of the orifice and arranged so that a marginal edge portion of the film intercepts the light beam.

2. In sound film apparatus, a light tube, a light sensitive cell, a rotating sound gate positioned between the tube and the cell and including a fixed stud provided with a transverse orifice arranged in substantial alignment with the axis of the tube, an optical system contained in the orifice, a member rotatable on the stud adapted to support a film intermediate its margin, and non-rotatable members on the stud provided with guideways in which the margins of the film run without surface contact.

3. In sound film apparatus, a light tube, a light sensitive cell, a rotating sound gate positioned between the tube and the cell and including a fixed stud provided with a transverse orifice arranged in substantial alignment with the axis of the tube, an optical system contained in the orifice, film supporting members freely rotatable on the stud on opposite sides of the aperture which supports the film along its margins only leaving the intermediate portion of the film unsupported.

4. Apparatus according to claim 2, in which the drum supporting member is provided with cut-away edges offering access to the ends of the optical system for cleaning purposes.

5. Sound film apparatus including a light tube, a light sensitive cell, a rotating sound gate intermediate the tube and the cell and including a fixed stud arranged at substantially right angles to the axis of the tube, a block fixed on the tube, the tube and the block being provided with aligning apertures, a condensing optical system arranged in the apertures, and at least one film supporting member rotatably mounted on the stud laterally of the block and adapted to support a film in such manner that a portion of the film is left free so as to intercept the light beam.

6. Sound film apparatus as claimed in claim 5, in which an additional film supporting member is rotatably mounted on the stud on the side of the block opposite the first member.

7. Sound film apparatus as claimed in claim 5, in which an additional film supporting member is rotatably mounted on the stud on the side of the block opposite the first member, both of said film supporting members being provided with cut-away edges offering access to the ends of the optical system for cleaning purposes.

8. Sound film apparatus including a light tube, a light sensitive cell, a rotating sound gate intermediate the tube and the cell and including a fixed stud arranged at substantially right angles to the axis of the tube, a block fixed on the tube, the tube and the block being provided with aligning apertures, a condensing optical system arranged in the apertures, and at least one film supporting member rotatably mounted on the stud laterally of the block and adapted to support a film in such manner that a portion of the film is left free so as to intercept the light beam and additional members fixed on the stud and provided with guideways over which the margins of the film run without surface contact.

EDWARD WILLIAM ESDAILE.
ROBERT PLATT-HEPWORTH.